United States Patent

Nishihara et al.

[11] Patent Number: 5,417,804
[45] Date of Patent: May 23, 1995

[54] OPTICAL WAVEGUIDE MANUFACTURING METHOD

[75] Inventors: Munekazu Nishihara, Neyagawa; Youichi Ohnishi, Higashiosaka; Mikio Takebayashi, Osaka, all of Japan

[73] Assignee: Matsushita Electric Industrial Co., Ltd., Osaka, Japan

[21] Appl. No.: 140,520

[22] Filed: Oct. 25, 1993

[30] Foreign Application Priority Data

Oct. 26, 1992 [JP] Japan .................. 4-287340
Jul. 22, 1993 [JP] Japan .................. 5-181165

[51] Int. Cl.⁶ .................................................. B44C 1/22
[52] U.S. Cl. ........................................ 216/24; 216/51; 216/101
[58] Field of Search ............ 156/650, 656, 657, 659.1, 156/667, 649; 385/129; 65/3.11

[56] References Cited

U.S. PATENT DOCUMENTS 4,692,207 9/1987 Bouadma et al. .............. 156/649
5,032,219 7/1991 Buchmann et al. ............ 156/643
5,032,220 7/1991 Yamamoto et al. ........... 156/667 X Primary Examiner—William Powell
Attorney, Agent, or Firm—Wenderoth, Lind & Ponack

[57] ABSTRACT

An optical waveguide includes a substrate in the form of either a silicon substrate with a silicon oxide layer formed at its upper surface or a quartz substrate, a first waveguide layer extending over the entire upper surface of the substrate, a layer having a low refractive index and a tapered end disposed over part of an upper surface of the first waveguide layer, and a second waveguide layer of the same refractive index as that of the first waveguide layer extending over an exposed surface of the first waveguide layer and an upper surface of the layer of low refractive index.

6 Claims, 3 Drawing Sheets

OPTICAL WAVEGUIDE MANUFACTURING METHOD

BACKGROUND OF THE INVENTION

The present invention relates to an optical waveguide to be used in an optical thin film component or the like and a manufacturing method thereof. The optical waveguide functions as an isolator for an optical element or as an optical circuit of an optical head to record/reproduce information of an optical disk.

An optical waveguide is the means mainly used to guide light to control much information at high speeds without being adversely influenced by surrounding electromagnetic waves.

An example of a conventional optical waveguide will be described with reference to FIG. 5.

FIG. 5 illustrates the basic structure of a conventional isolator of a model of an optical waveguide.

In FIG. 5, reference numeral 11 designates a monocrystalline substrate formed of LiNbO$_3$ or the like, 12 a Ti diffusion region, 13 a Ti non-diffusion region, 14 an end part through which light enters, 15 an end part through which light is brought in or out, 16 an end part from which light is projected, and 17 a Y-shaped branching part.

The optical waveguide operates in the following manner.

The Ti diffusion region 12 formed on the LiNbO$_3$ monocrystalline substrate 11 has a larger refractive index than the non-diffusion region 13. Therefore, light entering from the end part 14 is guided while confined within the Ti diffusion region 12, without spreading to the Ti non-diffusion region 13, and eventually projects from the end part 15. Light entering from the end part 15 is similarly guided to the end part 16 while it is kept confined in the Ti diffusion region 12. At this time, the light is hardly guided to the end part 14 because of optical loss due to the configuration of the Y-shaped branching part 17. This kind of element using LiNbO$_3$ can serve various functions in an optical device thanks to the acoustooptic effect if an electrode is added thereto.

However, the optical device cannot function unless a semiconductor laser as a light source, a photodetector, and the like are provided as a separate unit from the optical waveguide. Moreover, optical components such as prisms, etc. are necessary to introduce light into or lead light out of the optical waveguide. As such, an alignment technique of considerably high accuracy is required for assembling the prior art optical device.

Since both the optical circuit for introducing light and the optical circuit for detecting light should occupy only a two-dimensional area on the surface of the substrate, it is difficult to make the device compact and lightweight.

SUMMARY OF THE INVENTION

The object of the present invention is therefore to provide a highly functional and compact optical waveguide and a manufacturing method thereof, whereby an electronic circuit and an optical circuit can be formed on one substrate, i.e. can be integrated.

In accomplishing these and other objects, according to a first aspect of the present invention, there is provided an optical waveguide comprising: a substrate selected from the group of a silicon substrate having a silicon oxide layer formed at its upper surface, and a quartz substrate; a first waveguide layer extending over the entire upper surface of the substrate; a layer having a low refractive index and a tapered end disposed over a part of an upper surface of the first waveguide layer; and a second waveguide layer of the same refractive index as that of the first waveguide layer and which is disposed over an exposed surface of the first waveguide layer and an upper surface of the layer having a low refractive index.

According to a second aspect of the present invention, there is provided a method for manufacturing an optical waveguide comprising steps of: forming a first waveguide layer over the entire upper surface of a substrate selected from the group of a silicon substrate having a silicon oxide layer formed at its upper surface, and a quartz substrate, using a vacuum process; forming a layer having a low refractive index on a part of an upper surface of the first waveguide layer, using a vacuum process; applying a resist to an upper surface of the layer having a low refractive index, baking the resist at a temperature lower than conventional baking temperatures, exposing the resist, and then wet-etching the layer having the low refractive index in an etching solution of a phosphoric acid to taper an end of the layer; and coating a second waveguide layer on an exposed surface of the first waveguide layer and an upper surface of the layer of low refractive index, using a vacuum process, the second waveguide layer having the same refractive index as that of the first waveguide layer.

According to a third aspect of the present invention, there is provided an optical waveguide comprising: a glass substrate; a metallic layer formed on part of an upper surface of the glass substrate to define a step; a layer having a low refractive index provided over an exposed upper surface of the glass substrate and the metallic layer; and a waveguide layer having a high refractive index and a step and which layer is coated on the layer having a low refractive index.

According to a fourth aspect of the present invention, there is provided a method for manufacturing an optical waveguide comprising steps of: forming a metallic layer on an upper surface of a glass substrate; applying a resist on the metallic layer; etching the metallic layer to thereby form a step on the substrate; forming a layer having a low refractive index over an exposed upper surface of the glass substrate and the metallic layer; and coating a waveguide layer, which has a high refractive index, on the layer of low refractive index to thereby provide a step in the waveguide.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
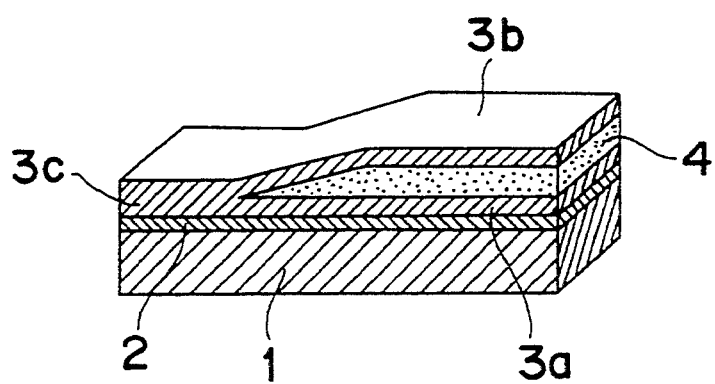
FIG. 1 is a cross-sectional view, in perspective, of a first embodiment of an optical waveguide according to the present invention.

Before the description of the present invention proceeds, it is to be noted that like parts are designated by like reference numerals throughout the accompanying drawings.

FIG. 1 is a perspective view of a first embodiment of an optical waveguide according to the present invention. The waveguide includes a silicon substrate 1, a silicon oxide film 2 extending over the entire upper surface of the silicon substrate 1, silicon nitride films 3a, 3b, 3c disposed on the upper surface of the silicon oxide film 2, and an aluminum oxide film 4 arranged between the silicon nitride films 3a and 3b. The left end of the aluminum oxide film 4 is tapered to separate the silicon nitride films 3a and 3b from each other.

The operation of the optical waveguide will be discussed below.

The silicon nitride film 3b has a larger refractive index than the aluminum oxide film 4, and therefore light is guided through the silicon nitride film 3b while being confined in the silicon nitride film 3b. Likewise, the silicon nitride film 3c has a larger refractive index than the silicon oxide film 2, thereby guiding light in a confined state therein. Moreover, since the refractive index of the silicon nitride film 3a is larger than that of the silicon oxide film 2 and that of the aluminum oxide film 4, light is guided through the silicon nitride film 3a while being confined within the silicon nitride film 3a.

Light from a semiconductor laser (not shown) built in the silicon substrate 1 can be guided into the silicon nitride film 3b by an annular grating or the like (not shown) which is formed by etching the upper surface of the silicon nitride film 3b.

The light guided through the silicon nitride film 3b reaches the silicon nitride film 3c. Then, the light is projected outside and at the same time, condensed by an annular grating or the like (not shown) which is formed by etching the upper surface of the silicon nitride film 3c, similar to the grating integrated with the silicon nitride film 3b. It is also possible to introduce and guide light into the silicon nitride film 3c by the same optical system.

The light passing through the silicon nitride film 3c is introduced to the silicon nitride film 3a. At this time, since the end part of the aluminum oxide film 4 is tapered, the light is hardly permitted to propagate from within the silicon nitride film 3c to the silicon nitride film 3b.

The silicon nitride films 3b, 3c alone function as an optical isolator. On the other hand, the optical waveguide functions as a three-dimensional optical directional coupler as a whole.

Now, a method of manufacturing the above optical waveguide will be described with reference to FIGS. 2A–2G.

Figure 2A:
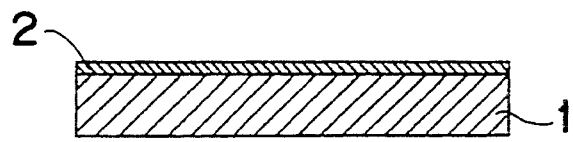
FIGS. 2A, 2B, 2C, 2D, 2E, 2F, and 2G are cross-sectional views showing a first embodiment of a method of manufacturing the optical waveguide of FIG. 1 according to the present invention.

As depicted in FIG. 2A, the silicon oxide film 2 is formed over the entire surface of the silicon substrate 1 by a vacuum process such as sputtering, CVD, or the like. A steam oxidation method or the like may be employed to form the silicon oxide film 2. If a quartz substrate is used instead of the silicon substrate 1, the silicon oxide film is omissible.

Subsequently, in FIG. 2B, a silicon nitride film 3a approximately 0.5 μm thick is formed over the entire surface of the silicon oxide film 2. The refractive index of the silicon nitride film 3a can be controlled if the partial pressure of each of $N_2$ and $O_2$ gases is controlled by the reactive sputtering method using Ar, $N_2$, $O_2$ gases and $Si_3N_4$ as a target. It is also possible to form the silicon nitride film 3a while controlling the refractive index and the optical loss by plasma CVD using $SiH_4$, $NH_3$, $N_2$, and $N_2$ gases, etc.

Figure 2B:
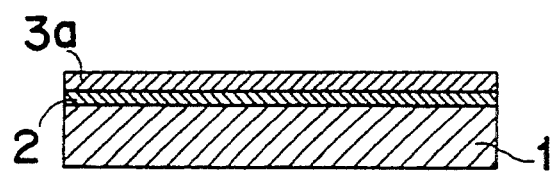
Figure 2C:
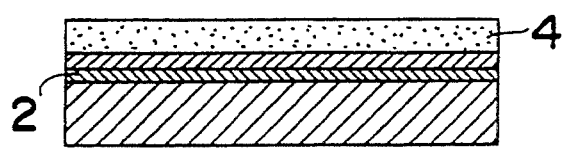

Then, an aluminum oxide film 4 approximately 1 μm thick is formed over the entire surface of the silicon nitride film 3a, as shown in FIG. 2C. At this time, the refractive index of the aluminum oxide film 4 is lower than that of the silicon nitride film 3a.

A resist having a thickness of 1 μm is applied on the upper surface of the aluminum oxide film 4 by a spin coater, and is baked at a temperature of 140° C. which is lower than the typical baking temperature of 145° C. Thereafter, a mask (not shown) of a required pattern is aligned with and overlayed on the resist. UV rays are irradiated to expose a resist layer 5 from above the mask. When the resist is developed in a developing solution, the resist layer 5 is formed on part of the surface of the aluminum oxide film 4 as shown in FIG. 2D.

Figure 2D:
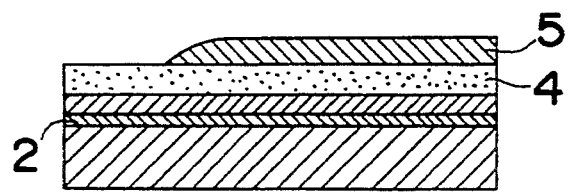
Figure 2E:
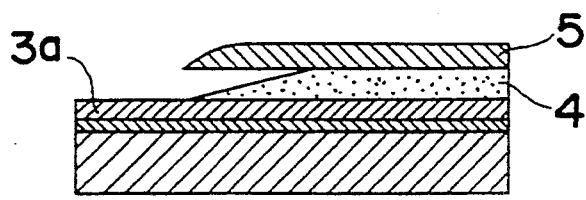

The product in the state shown in FIG. 2D is subjected to an etching solution of a phosphoric acid to wet-etch that part of the aluminum oxide film 4 that does not have the resist layer 5 formed thereon. At this time, since the etching solution penetrates the interface between the aluminum oxide film 4 and the resist layer 5 to side-etch a part of the aluminum oxide film 4, the aluminum oxide film 4 takes the form as shown in FIG. 2E. Only the aluminum oxide film 4 is selectively etched because the silicon nitride film 3a is resistant to phosphoric acid. A film of another material which can be selectively etched or any other kind of etching solution can be used so long as the combination thereof and the refractive index are satisfactory.

Figure 2F:
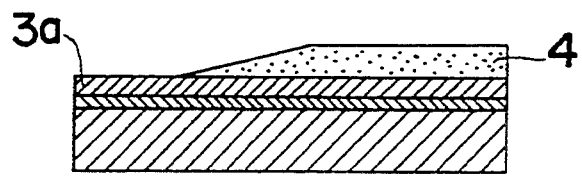

When the resist layer 5 is removed by ashing after the product is cleaned and dried, the aluminum oxide film 4 is exposed as shown in FIG. 2F.

Figure 2G:
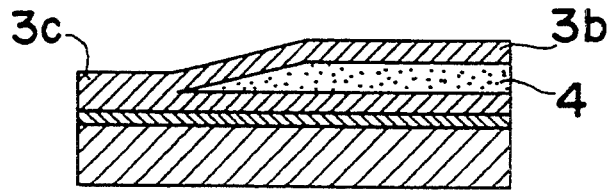

In the final process which is the same as that depicted by FIG. 2B, a silicon nitride film 3b about 0.5 μm thick is coated on the upper surface of the product. The refractive index of film 3b corresponds to that of the silicon nitride film 3a. Consequently, the silicon nitride film 3c as shown in FIG. 2G is obtained.

According to the present invention, the silicon oxide layer is formed on the silicon substrate, a waveguide layer of a silicon nitride film is formed on the oxide layer, an aluminum oxide layer of a low refractive index having a tapered end is provided on a part of the upper surface of the waveguide layer, and a silicon nitride film of the same high refractive index as that of the waveguide layer is laminated thereover. Therefore, the electronic circuit and the optical circuit can be integrated, and a highly functional and compact optical multilayered waveguide is provided. Because the waveguide layers and the layer of a low refractive index are thin films formed by a vacuum process and because a resist applied on the layer having a low refractive index is wet-etched in an etching solution of a phosphoric acid after being baked at a low temperature and then exposed to radiation, the optical waveguide can be manufactured by conventional techniques used for manufacturing semiconductors.

According to the present invention, because the optical waveguide is formed of an Si substrate, a semiconductor laser as a light source and a photodetector can be built in the same substrate.

If the waveguide layer of a silicon compound were directly formed on the Si substrate, it would be impossible to confine the light since the refractive index of the Si substrate would be larger than that of the waveguide layer. Therefore, a layer of silicon oxide having a smaller refractive index than the silicon compound is provided on the Si substrate to act as an optical buffer.

Meanwhile, a layer of aluminum oxide having a refractive index lower than that of a silicon compound is formed between the waveguide layers, and therefore serves as a cladding layer which forces the light to branch through the waveguide layers. Moreover, because an end of the aluminum oxide layer is tapered, the optical loss at the branch of the waveguide is suppressed by the waveguide layer coating the aluminum oxide layer.

When an annular grating is etched in each waveguide layer of the multi-layered structure, the guiding and the condensing of the light are carried out with respect to a common Si substrate.

Moreover, because a vacuum process, e.g., sputtering or CVD is used to form the waveguide layer and the cladding layer, the refractive indices of these layers can be selected by controlling the reactivity associated with the gas used in the process.

Because a resist is applied on the layer having a low refractive index, is baked at a low temperature, and is exposed to radiation, the adhesive force between the resist and the low refractive index layer can be controlled so that the etching solution will remain between the resist and the layer having the low refractive index during the wet-etching process. Accordingly, a controlled side-etching of the layer is effected so that the end of the layer becomes tapered.

Although the aluminum oxide of the layer having a low refractive index is etched by the etching solution of a phosphoric acid, the silicon compound of the waveguide layer is not etched. The selective etching of only the layer having the low refractive index mitigates the scattering loss which would otherwise result from an unevenness of the surface of the substrate on which the waveguide layer is laminated.

A second embodiment of the present invention will be described hereinbelow with reference to FIGS. 3 and 4A–4G.

Figure 3:
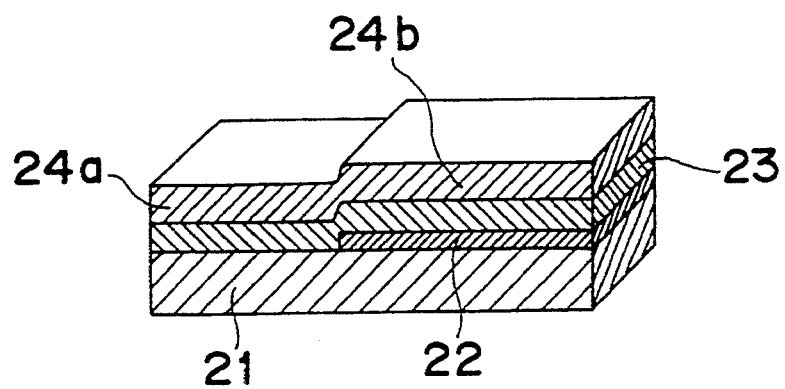
FIG. 3 is a cross-sectional view, in perspective, of a second embodiment of an optical waveguide according to the present invention.
Figure 5:
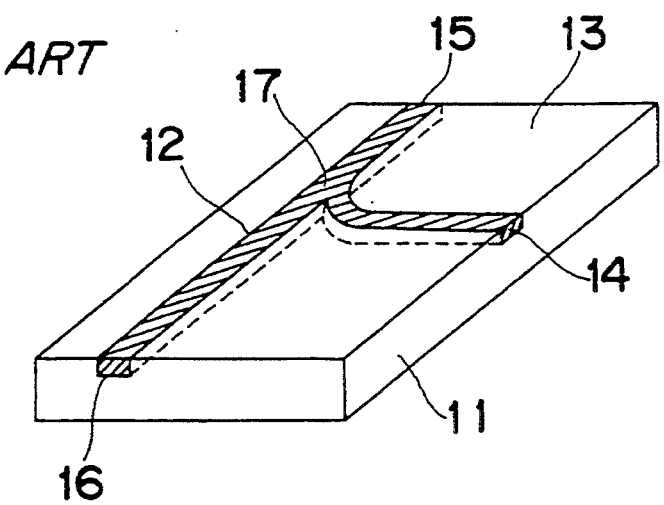
FIG. 5 is a perspective view of the fundamental structure of a conventional optical waveguide.

FIG. 3 is a perspective view of the second embodiment of the optical waveguide according to the present invention. The waveguide includes a quartz glass substrate 21, an NiCr film 22 disposed on part of the upper surface of the quartz glass substrate 21, a silicon oxide film 23 extending over the entire upper surface of the NiCr film 22 and the exposed upper surface of the quartz glass substrate 21, and silicon nitride films 24a and 24b disposed over the entire upper surface of the silicon oxide film 23. The silicon nitride film 24a is located at a level below the silicon nitride film 24b such that a step is formed therebetween.

The operation of the optical waveguide will be explained hereinbelow.

Since the silicon nitride films 24a, 24b have a larger refractive index than the silicon oxide film 23, light is guided through the silicon nitride films 24a, 24b while being confined in the silicon nitride films 24a, 24b.

Light from a semiconductor laser (not shown) at the rear surface of the quartz glass substrate 21 can be introduced into the silicon nitride film 24a by an annular grating, etc. (not shown) etched in the silicon nitride film 24a.

The light guided through the silicon nitride film 24a reaches the silicon nitride film 24b. During this time, when the light passes the step between the silicon nitride films 24a and 24b, the optical mode of the incident light is converted with high efficiency to the 0-order mode with low optical loss when the incident light is a primary-mode light.

In the case where the step is less than 40% and more than 50% of the thickness of each silicon nitride film 24a, 24b, the converting efficiency is greatly lowered. Therefore, the step is maintained within 40–50% of the thickness of each silicon nitride film 24a, 24b by controlling the thickness of the NiCr film 22.

The light can be projected outside and at the same time, the light can be condensed by an annular grating or the like (not shown) etched in the silicon nitride film 24b in the same fashion as the grating etched in the silicon nitride film 24a. Since the NiCr film 22 functions as a mirror at this time, the projecting efficiency is improved.

Moreover, external light can be taken in and guided within the silicon nitride film 24b by the same optical system. The light passing through the silicon nitride film 24b reaches the silicon nitride film 24a. Light of the 0-order mode is hardly converted to the primary mode when the light passes the step between the silicon nitride films 24a and 24b. When the incident light of the primary mode and the detecting light of the 0-order mode are projected from a grating (not shown) on the silicon nitride film 24a, the projecting angles of the incident light of the primary mode and the detecting light of the 0-order mode differ due to the difference of the mode characteristics of the lights. Therefore, only the light of the 0-order mode can be detected by a photodetector (not shown) arranged adjacent to the semiconductor laser. That is, the incident light and the detecting light can be separated through conversion of the mode by the single waveguide layer.

A method of manufacturing the above-described optical waveguide will be described with reference to FIGS. 4A–4G.

Figure 4A:
FIGS. 4A, 4B, 4C, 4D, 4E, 4F, and 4G are cross-sectional views showing a second embodiment of a method of manufacturing the optical waveguide of FIG. 3 according to the present invention.

In the first place, the NiCr film 22 is formed over the entire surface of the quartz glass substrate 21 using a vacuum process, e.g., sputtering, vapor deposition or the like. The thickness of the NiCr film 22 is 40–50% of the thickness of the silicon nitride film 24, as shown in FIG. 4A. A metal (aluminum or the like) other than NiCr can be used as the film 22.

Figure 4B:
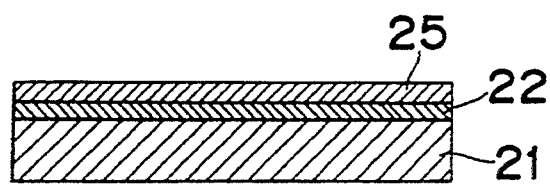
Figure 4C:
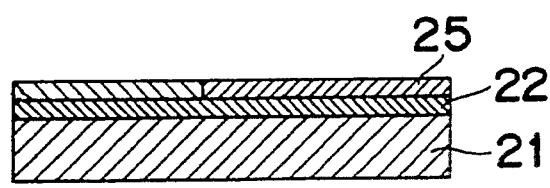
Figure 4D:
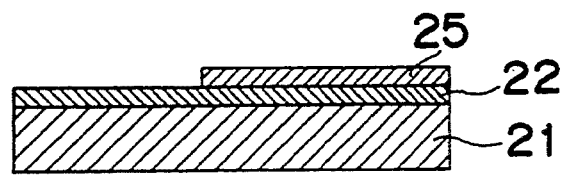

Subsequently in FIG. 4B, a resist is applied over the entire NiCr film 22 by a spin coater, and is baked by a heating plate, etc. A mask (not shown) in a desired pattern is further aligned with and overlaid on the resist layer 25, which is exposed by UV rays irradiated thereon from above. As a result, the resist layer 25 is partially exposed as shown in FIG. 4C. When the resist is developed by a developing solution, a resist layer 25 as indicated in FIG. 4D is formed over part of the NiCr film 22. The product is baked again by a heating plate or the like.

Figure 4E:

The intermediate product shown in FIG. 4D is placed in an etching solution, whereby the part of the NiCr film 22 not covered by the resist layer 25 is wet-etched, and is then cleaned and dried. When the resist layer 25 is removed by ashing thereafter, the end part of the NiCr film 22 defines a step as illustrated in FIG. 4E.

Figure 4F:
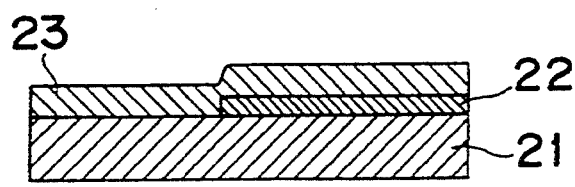

Then, as shown in FIG. 4F, a silicon oxide film 23 approximately 1 μm thick is formed over the exposed surface of the quartz glass substrate 21 and the NiCr film 22.

Figure 4G:
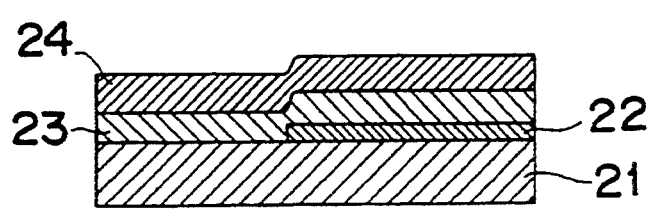

Lastly, as shown in FIG. 4G, the silicon nitride film 24, having a refractive index greater than that of the silicon oxide film 23, is formed over the entire upper surface of the silicon oxide film 23 to overcoat the latter film 23. At this time, the refractive index of the silicon nitride film 24 can be controlled by controlling the partial pressure of $N_2$, $O_2$ gases and the exhausting power in the reactive sputtering method using $Si_3N_4$ or Si as a target, and Ar and $N_2$, $O_2$ gases, etc. The refractive index and the optical loss can be likewise controlled by plasma CVD using $SiH_4$, $NH_3$, $N_2$, $N_2O$ gases or the like.

As described hereinabove, according to the present invention, the metallic layer defines a step on the glass substrate, the low refractive index layer covers the metallic layer, and the waveguide layer having a high refractive index covers the low refractive index layer and has a step of 40–50% of the thickness thereof. Therefore, the incident light and the detecting light can be separated highly efficiently with low optical loss when the lights are guided along the same waveguide layer. That is, a highly functional and compact optical waveguide is achieved. Moreover, since the metallic layer, the low refractive index layer, and the waveguide layer are formed of films using a vacuum process and the metallic layer is etched to define the step part after the resist is developed, the optical waveguide can be manufactured at a low cost and easily in accordance with conventional process used to manufacture semiconductors.

With the present invention, the light propagating within the optical waveguide on the substrate is converted to a 0-order optical mode with high efficiency while the loss thereof is kept low at the step of the waveguide layer. As a result, the projecting angles are rendered different when the incident light of the primary mode and the detecting light of the 0-order mode are emitted to a detecting part through the grating, thereby making it possible to separate the incident light from the detecting light.

The metallic layer on the glass substrate serves not only as a base film to form the step but also as a mirror when the light is projected from the waveguide layer to promote the efficiency at which the light is projected.

Because the layer having the low refractive index layer has a refractive index lower than that of the waveguide layer, the former layer functions as an optical buffer to confine the light within the waveguide layer.

Further because an annular grating is etched in the waveguide layer, the guiding and the condensing of light are carried out in association with a common glass substrate.

By using the resist, the end of the metallic layer can be shaped as desired.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they otherwise depart therefrom.

We claim:

1. A method for manufacturing an optical waveguide, said method comprising:

forming a first waveguide layer over the entire upper surface of a substrate selected from the group consisting of a silicon substrate having a silicon oxide layer at its upper surface, and a quartz substrate, using a vacuum process;

forming a layer having a refractive index lower than that of said first waveguide layer on a part of an upper surface of the first waveguide layer, using a vacuum process;

applying a resist to an upper surface of the layer having the lower refractive index, baking the resist, exposing the resist, and developing the resist to form a pattern on the layer having the lower refractive index;

tapering one end of said layer having the lower refractive index and exposing a surface of said first waveguide layer, including by wet-etching the layer having the lower refractive index:

removing the resist; and forming a second waveguide layer over the exposed surface of the first waveguide layer and an upper surface of the layer having the lower refractive index, using a vacuum process, the second waveguide layer having the same refractive index as that of the first waveguide layer.

2. The method according to claim 1, wherein said forming of the first and second waveguide layers comprises forming the layers each of a silicon compound, the forming of the layer having a lower refractive index comprises forming the layer of an aluminum oxide, and said wet-etching comprises wet-etching said aluminum oxide with a phosphoric acid.

3. The method according to claim 1, wherein the forming of the first and second waveguide layers comprises forming the waveguide layers each with a thickness of 0.5 μm, and the forming of the layer of the lower refractive index comprises forming the layer with a thickness of 1 μm.

4. The method according to claim 1 wherein the baking of the resist is carried out at a temperature of 140° C.

5. The method according to claim 2, wherein the baking of the resist is carried out at a temperature of 140° C.

6. The method according to claim 3, wherein the baking of the resist is carried out at a temperature of 140° C.

* * * * *